Patented Jan. 27, 1925.

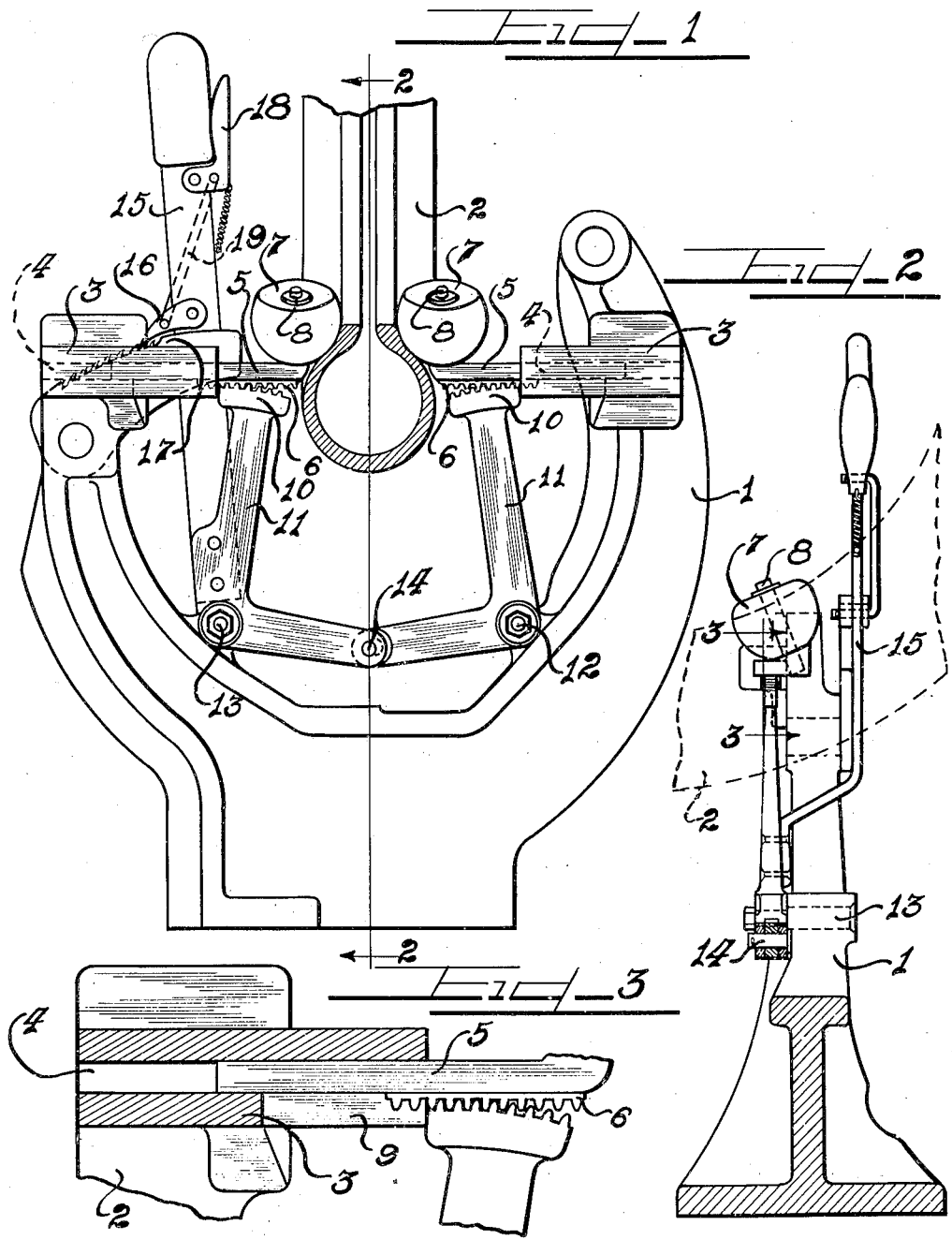

1,524,055

UNITED STATES PATENT OFFICE.

FRANK M. PIERCE, OF CHICAGO, ILLINOIS, ASSIGNOR TO PIERCE WRAPPING MACHINE COMPANY, OF CHICAGO, ILLINOIS, A CORPORATION OF ILLINOIS.

TIRE-WRAPPING MACHINE.

Application filed July 16, 1923. Serial No. 651,721.

*To all whom it may concern:*

Be it known that I, FRANK M. PIERCE, a citizen of the United States, and a resident of the city of Chicago, in the county of Cook and State of Illinois, have invented certain new and useful Improvements in a Tire-Wrapping Machine; and I do hereby declare that the following is a full, clear, and exact description of the same, reference being had to the accompanying drawings and to the numerals of reference marked thereon, which form a part of this specification.

This invention relates to bead pressing means for tire wrapping machines.

Automobile tires and similar annular articles are now quite generally wrapped for shipment or storage by the mechanical application of a helical strip of fabric, paper or similar material thereon. This application being accomplished by the relative rotation in different planes of the tire and a shuttle carrying the wrapping material. In order that the wrapping may be properly applied it is desirable that the beads or free edges of the tire be pressed together during the wrapping process. The present invention provides improved means for accomplishing this purpose.

It is an important object of this invention to provide bead pressing means for the purpose specified, which are simple and strong in construction and which may be quickly and conveniently manipulated.

Other and further important objects of this invention will be apparent from the disclosures in the specification and the accompanying drawings.

The invention (in a preferred form) is illustrated in the drawings and hereinafter more fully described.

On the drawings—

Figure 1 is a front elevation of a wrapping machine shuttle frame showing the bead pressing means of this invention and position thereon, and showing a fragmentary portion of the tire which is to be wrapped in sections.

Figure 2 is a fragmentary section on the line 2—2 of Figure 1 with parts in elevation in which the tire is shown in dotted lines.

Figure 3 is an enlarged fragmentary section with parts in elevation on the line 3—3 of Figure 2.

As shown on the drawings—

The reference numeral 1 indicates a portion of the shuttle frame of a tire wrapping machine which may be of any desired type and the general type of which is exemplified in the U. S. patent to Frank M. Pierce, No. 1,263,923, which was issued on April 23, 1918. A tire which is to be wrapped is positioned by suitable mechanism such as described in the above patent, in a position relative to the frame 1 such as indicated in Figures 1 and 2; the tire in the present instance being designated by the reference numeral 2.

Formed as a part of or secured to the frame 1, near the upper end thereof, on either side of the tire 2, are projecting members 3 which extend inwardly toward the tire and which have guide-ways formed therein as indicated by the reference numeral 4. Slidably mounted in each of the guide-ways 4 is a bar 5 which has rack gear teeth formed on the lower surface thereof, at 6. Supported on the inner end of each of said bars 5, is a bead pressing roller 7 which is rotatably mounted on a stud 8, extending upwardly from said bar 5. Said bead pressing rollers are spherical in form and are adapted to engage the beads of the tire 2, to clasp the same inwardly during the process of wrapping, whereby a tight application of the helical wrapping strip is assured.

In order that the bars 5 may be freely moved relatively to the members 3, the under portions of the guide-ways 4 are cut away as indicated at 9, to permit inward and outward movement of the tooth portions 6. In order that said bars 5 and the bead pressing rollers thereon may be conveniently adjusted relative to the tire 2, each of said tooth portions 6 is engaged by a tooth segment 10 formed on the upper end of one arm 11 of a bell crank lever; said bell crank lever being pivoted on the frame 1 at 12 and 13 and the other arms thereof extending inwardly and being pivotally joined together by a slot and pin connection at 14. Secured to the arm 11 of one of said bell crank levers is a lever 15 which extends upwardly above the frame 1 and which is offset, as indicated in Figure 2, to clear the opposite face of said frame. It will be evident that any motion imparted to said lever 15 is transmitted through the bell crank levers and the tooth segments 10 to the tooth portions of the bars 5, consequently imparting a simultaneous movement of the bead pressing rollers 7 toward or away from each other; the simultaneous movement of the bell crank levers being assured by the connection at 14 between the lower inwardly extending arms thereof.

The lever 15 may be locked in adjusted position through the engagement of a mutual spring-impelled pawl 16 which is pivotally mounted thereon, with a usual notched segment 17, mounted on the frame 1. Said pawl 16 may of course be relieved through a usual handle 18 which is pivoted on lever 15 and which is connected to said pawl through a link 19. It will be apparent from the foregoing description that this invention provides means whereby the beads of a tire may be pressed together as tightly as desired during the process of wrapping and the provision of the lever 15 and connected mechanism affords means whereby said bead pressing means may be conveniently manipulated for different sized tires and during the process of inserting a tire into and removing from the machine. Due to the fact that the bead pressing means are supported independently of the adjusting means therefore there is little likelihood of the same becoming worn or loose and since they are moved in a straight line toward or away from the tire, very accurate adjustments thereof may be attained. The apparatus is simple and economical in construction and cannot readily get out of order.

I am aware that numerous details of construction may be varied through a wide range without departing from the principles of this invention and I therefore do not purpose limiting the patent granted hereon otherwise than necessitated by the prior art.

I claim as my invention—

1. The combination with a tire wrapping machine including a frame, of bead pressing means having teeth slidably mounted on the frame, and lever-actuated means engaging said teeth for moving said bead pressing means into operative position.

2. The combination with a tire wrapping machine including a frame of bead pressing means thereon, gear teeth associated with said bead pressing means, means pivoted on the frame having gear teeth thereon coacting with the first mentioned gear teeth, and a lever for positioning said pivoted means.

3. The combination with a tire wrapping machine including a frame, of a rack bar mounted on the frame on each side of a tire which is being wrapped, bead pressing means on each rack bar, a pair of adjusting members having teeth coacting with the teeth on said rack bars and a lever for simultaneously actuating said members to adjusting position.

4. The combination with a tire wrapping machine of slidably mounted rack means for pressing the beads of a tire as the same is wrapped thereby, pivotally mounted means having teeth for engaging the teeth of said bead pressing means and moving the same toward or away from the tire, a lever for actuating said pivotal means to adjusted position, and means for locking said pivotally mounted means in adjusted position.

In testimony whereof I have hereunto subscribed my name in the presence of two subscribing witnesses.

FRANK M. PIERCE.

Witnesses:
JESSIE MANNERS,
E. M. HAASEN.